United States Patent [19]

Sandvig et al.

[11] 4,430,240
[45] Feb. 7, 1984

[54] DE-ICING CHEMICALS AND THEIR PREPARATION FROM POLYSACCHARIDE SOURCES

[75] Inventors: Robert L. Sandvig; William A. Klemm; Jack R. Gaines; Robert W. Looyenga, all of Rapid City, S. Dak.

[73] Assignee: State of South Dakota as represented by the Department of Transportation, Pierre, S. Dak.

[21] Appl. No.: 338,848

[22] Filed: Jan. 12, 1982

[51] Int. Cl.$^3$ ............................................. C09K 3/18
[52] U.S. Cl. ...................................... 252/70; 106/2; 106/13
[58] Field of Search ...................... 106/2, 13; 252/70

[56] References Cited

U.S. PATENT DOCUMENTS 4,351,669 9/1982 Nielsen .................................. 106/2
4,377,488 3/1983 Gancy .................................. 252/40

Primary Examiner—Thurman K. Page
Attorney, Agent, or Firm—Merchant, Gould, Smith, Edell, Welter & Schmidt

[57] ABSTRACT

De-icing chemicals intended primarily for de-icing pavement such as roads, bridges, and runways are prepared from polysaccharide sources (e.g. waste products such as sawdust) by reaction at elevated pressure and temperature with alkaline earth metal oxides or hydroxides in the presence of water. The de-icing chemicals are impure mixtures of alkaline earth metal salts of acetic acid, lactic acid and glycolic acid with the mixture being substantially free of alkaline earth metal salts of oxalic acid and formic acid. The de-icing chemicals are intended to be a substitute for the inorganic chloride salts (e.g. sodium chloride) commonly used for de-icing highways.

48 Claims, No Drawings

DE-ICING CHEMICALS AND THEIR PREPARATION FROM POLYSACCHARIDE SOURCES

FIELD OF THE INVENTION

The invention relates to de-icing chemicals intended primarily for de-icing pavement such as roads, bridges, and runways. The de-icing chemicals are prepared by the chemical conversion of polysaccharide materials (e.g. sawdust).

BACKGROUND OF THE INVENTION

The presence of ice and snow on pavement such as roads, sidewalks, bridges, runways, and the like presents safety hazards and operational obstacles to many everyday activities such as driving, flying, etc.

Over the years, a variety of techniques have been used in the colder parts of the world to remove or destroy this ice and snow. The techniques utilized have ranged from simple mechanical approaches (e.g. shoveling or plowing) to heating (e.g. by means of buried heating elements or by the direct application of heat) to chemical methods (e.g. the use of de-icing chemicals such as sodium chloride and calcium chloride). Where large surface areas are involved, such as roadways and runways, a combination of mechanical de-icing (e.g. snowplowing) and chemical de-icing (e.g. salt mixed with sand) is commonly used.

The most commonly used chemical de-icer for highways is sodium chloride (or rock salt as it is sometimes called). Sodium chloride (i.e. salt) is used as a chemical de-icer because it is relatively inexpensive, it is readily available in large quantities, and it has an attractive weight efficiency as a de-icer. At the present time it is estimated that the USA, alone, uses about 9 or 10 million tons of salt each year for de-icing purposes.

From time to time, various suggestions have been made to use materials other than sodium chloride salt as a chemical de-icer for highways and other paved areas. However, the low cost of purchasing and applying sodium chloride salt as a roadway de-icer has tended to discourage commercial interest in alternative de-icers even though some alternatives have been proposed. For example, methanol and a mixture of calcium and magnesium acetates (commonly called "CMA") are both reported to be as effective as salt for roadway de-icing purposes. However, neither alternative has replaced salt as a highway de-icer.

In recent years, increased attention has been focused on the total economic impact of the use of sodium chloride salt as a highway de-icing chemical and it has been discovered that while the initial cost of sodium chloride salt is significantly lower than the initial cost of other chemical de-icers, the total cost of using sodium chloride salt as a highway de-icing chemical is enormous when consideration is given to the corrosive damage to vehicles and pavement, corrosiveness to metal structures such as bridge elements and highway reinforcing bars, and environmental damage to soil, water, plants and animals. By way of illustration, the U.S. Environmental Protection Agency published data in 1976 suggesting that the conservative cost of the damage resulting from the use of sodium chloride salt for highway de-icing is approximately fourteen times the direct cost of purchasing and applying the salt in the first instance. Against this background, the State of South Dakota has already limited future use of sodium chloride salt for highway de-icing purposes and other political bodies may take similar actions in the future.

With these economic incentives, new research interest has been directed toward the idea of developing alternative de-icing chemicals that would have a total cost (e.g. on a state wide basis) which would be significantly less than the total cost associated with the use of sodium chloride salt as a highway de-icer. However, if the highway community is to be provided with an effective, non-corrosive, environmentally acceptable chemical de-icer, it is necessary to develop commercially attractive production methods. Processes must be found that are economically attractive and produce the de-icing product at an acceptable cost. To reduce transportation costs, it would be desirable if the de-icing product could be made from raw materials that are found in the geographic areas that use de-icing chemicals.

Against this background, there has been renewed interest in the possible use of a generally equi-molar mixture of calcium and magnesium acetates (commonly referred to as "CMA") which has shown considerable promise as a de-icing chemical. Limited field tests have confirmed its ability to function as a de-icer. Moreover, CMA does not contain the chloride ion which is present in sodium chloride salt and which is responsible for many of the corrosive side-effects of using sodium chloride as a highway de-icer. However, CMA is expensive to manufacture if it is prepared by classical chemical methods using relatively pure chemicals. Consequently, some suggestions have been made that a less pure form of acetic acid might be used in an effort to reduce the cost of making CMA and some consideration has been given to the possibility of producing CMA by a process in which a crude form of acetic acid is made by reacting cellulose with alkali metal or alkaline earth metal hydroxides at atmospheric pressure. For example, it is known that acetic acid can be made by fusing sodium hydroxide with cellulosic materials to provide yields of acetic acid of about 15 percent. However, it has been noted that the production of acetic acid by this route is accompanied by the production of large amounts of oxalic acid. Since the salts of oxalic acid are potentially dangerous to the environment, acetic acid must either be made by a different mechanism or the oxalic acid must be separated from the acetic acid before CMA is prepared and used as a roadway de-icer. Research continues toward this end.

Under the circumstances, there exists a continuing need to develop practical, alternative chemical de-icers which will have a significantly lower economic and environmental consequences.

SUMMARY OF THE INVENTION

The present invention is based upon the observation and discovery that the polysaccharide components (e.g. cellulose) from various sources including many solid wastes can be chemically converted into a crude reaction product that contains a number of different chemicals. From this crude reaction product, it is possible to separate an impure mixture of chemicals that consists essentially of the salts of acetic acid, lactic acid and glycolic acid with the mixture being substantially free of salts of oxalic or formic acid. This mixture of salts is an effective substitute for sodium chloride salt used in the de-icing of pavement, is substantially less expensive to make than manufacturing CMA from any available grade of acetic acid, and significantly reduces many of the adverse economic consequences of using sodium chloride salt for highway de-icing purposes.

Briefly described, the process of the present invention includes the following steps:

(a) obtaining a crude source of polysaccharide, typically as the polysaccharide component of solid residues or wastes (e.g. sawdust, waste paper or straw);

(b) optionally and preferably pre-soaking the polysaccharide material in water (which may be acidic, neutral or basic);

(c) mixing the wet polysaccharide material with an effective amount of a treating agent selected from the group consisting of alkaline earth metal oxides and hydroxides;

(d) heating the treated wet mixture to a reaction temperature under pressure, thereby resulting in reaction of the wet mixture;

(e) reducing the temperature of the reaction mixture to a temperature below the initiation temperature;

(f) removing volatile by-products of the reaction from the reaction mixture;

(g) separating the volatile-free reaction mixture into a liquid phase and a solid phase;

(h) recovering from the liquid phase a mixture of chemicals including the alkaline earth salts of acetic acid, lactic acid and glycolic acid with the mixture being substantially free of alkaline earth salts of oxalic acid and formic acid.

The mixed chemicals recovered in step "h" of the process described above may be recovered and used in the form of an aqueous solution or the water may be removed to form a granular mixture of the salts. Both the liquid and the granular materials can be used as a de-icer without further modification. Further, these materials can be used alone or can be mixed with other chemicals or grit (e.g. sand) in ways which are well-known.

DETAILED DISCUSSION

General Process Considerations

The reaction of cellusosic materials (e.g. sawdust) with bases such as sodium hydroxide or lime is described in the literature (e.g. U.S. Pat. No. 2,750,414) and many variations of this general process have been suggested. To our knowledge, such processes have tended to focus on the various acids (e.g. oxalic acid) which can be made in this manner and the general process has been manipulated to favor the production of one acid or another.

In evaluating this general process as one of a number of possible sources of acetic acid for use in making CMA, it was unexpectedly discovered that the process could be manipulated in such a way as to prepare an effective chemical de-icer without the anticipated need to follow all of the steps of making crude acetic acid, substantially purifying or concentrating the acetic acid, and then reacting the concentrated acetic acid with calcium and magnesium bases to form CMA.

For purposes of making the present chemical de-icer, it has been discovered that (a) polysaccharide sources (e.g. waste products such as sawdust) can be used as the starting material;

(b) the presence of a substantial amount of water is required in the reaction zone;

(c) alkaline earth metal bases (e.g. the oxides or hydroxides) must be used rather than alkali metal oxides or hydroxides;

(d) the reaction zone must be operated under pressure;

(e) the reaction zone should not have an oxidizing atmosphere (e.g. large amounts of oxygen should be excluded from the reaction zone);

(f) the amount of alkaline earth metal oxide or hydroxide used may vary, although it will usually be about the theoretical amount needed to convert all of the polysaccharide waste product into calcium acetate; and (g) the solid phase of the resulting crude reaction product is desirably removed or separated from the desired reaction products which are present in the liquid or aqueous phase of the crude reaction product.

The fraction of the crude reaction product that is useful as a chemical de-icer is the water soluble portion that is rich in alkaline earth metal salts of acetic acid, lactic acid and glycolic acid, together with various other water soluble materials. This fraction is unique in that it is substantially free of the alkaline earth metal salts of formic acid and oxalic acid (i.e. these salts typically account for less than 0.25 percent by weight of the total solids in the liquid phase of the reaction product). The latter salts are either removed with the water insoluble components of the crude reaction product or, more likely, their production is depressed by the reaction conditions that are being employed.

The present invention will be further understood by reference to the following description of the process conditions and raw materials.

Polysaccharide Raw Materials

Suitable raw materials are any waste materials that are rich in polysaccharides. Such materials include wood particles (e.g. sawdust and wood chips), straw, corn stalks, waste paper, sunflower stalks, starch, and the like. Because of their ready availability and general ease of chemical conversion, wood particles (e.g. sawdust) are often preferred as a raw material for use in the present invention. If desired, mixtures of raw materials may be used. In each instance, process conditions will be optimized to reflect the nature and quality and form of the particular raw material being used.

If the raw material is not already in the form of finely divided particles (e.g. sawdust), the raw material should be reduced in size to facilitate the chemical reaction and handling. Size is important, but not critical. Finely divided particles are preferred.

Pre-Treatment

If the raw material (e.g. a cellulosic waste) is not already in the form of an aqueous slurry or solution, it is desirable but not essential that the raw material be treated by being soaked in a substantial excess of water. The effect of this pre-treatment is to substantially completely saturate the raw material, thereby enhancing the subsequent chemical conversion of the raw material. If desired, acids or bases can be added to the water to enhance this pretreatment. For many purposes, the use of an aqueous soak having a pH below 7 (e.g. a pH below 4) is preferred since the lower pH tends to cause the natural fibers and cell structure of cellulosic raw materials to begin to separate and/or fracture.

The aqueous soak or pre-treatment of the polysaccharide raw material may be conducted at temperatures ranging from room temperature (i.e. about 20° C.) to elevated temperatures. Temperatures within the range of 23° C.–65° C. are preferred.

The length of the pre-soak may vary widely, but in general a pre-soak of at least four hours (e.g. 10–100 hours) is typical.

Treating Agent

The treating agents used to chemically react with the polysaccharide raw materials will be selected from the group consisting of alkaline earth metal oxides and hydroxides (and their functional equivalents). Calcium and magnesium oxides and hydroxides are preferred. The amount of treating agents used can vary, but will generally be from 50 to 150 percent of the theoretical or stoicheometric amount of treating agent required to convert all of the polysaccharide waste into calcium acetate, assuming that all of the polysaccharide is converted into acetic acid. Amounts of treating agent which are about equal to the stoichiometric amount (i.e. within 10 percent of the stoichiometric amount) are preferred.

Initiating the Reaction

The polysaccharide raw material and the treating agent (e.g. calcium hydroxide) together with sufficient water to provide an easily manageable slurry (e.g. 5–50 percent solids, preferably 10–25 percent solids) will be introduced into a suitable reaction zone (e.g. an autoclave or continuous tube reactor) and the temperature of the system raised to a reaction temperature which is typically above 150° C., usually within the range of 170° C.–180° C. Typically, the time required to reach the reaction temperature will be 20–120 minutes, e.g. 30–90 minutes. After the reaction has been started, the temperature will usually be allowed to rise to a level within the range of 200° C.–350° C., usually within the range of 250° C.–300° C.

The reaction time (following attainment of reaction temperature) will usually be in excess of 5 minutes (e.g. 10 minutes–45 minutes).

It is important that the reaction zone operate under superatmospheric pressure and a sealed or closed system such as an autoclave is appropriate. If the system is totally closed, the auto-generated pressure will typically rise to a point within the range of 400–4,000 psig (e.g. 2,000–3,000 psig). If desired, the system can be further pressurized by the use of a gas such as nitrogen or a pressure regulating system can be used to bleed off the vapors in the reaction zone when the pressure exceeds a pre-determined level (e.g. limit the pressure to 3,000 psig).

The use of a closed system allows one easily to avoid the presence of an oxidizing atmosphere in the reaction zone by excluding air.

When it is desired to terminate the reaction the reaction mixture is then cooled.

Separating the Reaction Mixture

The reaction mixture is next separated into a liquid phase and a solids phase by filtration and/or decantation. Removing the insoluble solids is important since any oxalates that are formed during the reaction are water insoluble and can be removed from the liquid phase in a very simple and convenient fashion by filtration or decantation. The water-insoluble solids may be further separated from each other to recover chemical values or the solids may simply be dried and used as a grit or filler (e.g. the insoluble solids can be disposed of by mixing with sand and cement during the manufacture of concrete blocks).

The liquid phase (now free of the water insoluble solids) which contains the desired chemical mixture for use as a de-icer may be further refined by a variety of techniques to remove other unwanted components. For example, the liquid phase may be steamed distilled to remove some organic components. Further, various unwanted gummy, tarry materials may be removed by solvent extraction using, for example, chloroform as the extractive solvent.

The resulting liquid, primarily water, will contain the desired alkaline earth metal salts of acetic acid, lactic acid and glycolic acid, together with various other water soluble materials. This liquid mixture is also substantially free of the alkaline earth metal salts of formic acid and oxalic acid (i.e. these salts typically account for less than 0.25 percent by weight of the total solids in the liquid mixture, often less than 100 ppm).

If desired, the final liquid mixture can be concentrated by, for example, evaporation or reverse osmosis to form a liquid concentrate which can be sprayed on iced surfaces or the liquid product can be dried to form a granular material which can be used for de-icing purposes much in the same manner as sodium chloride salt.

The present invention will be further understood by reference to the following specific examples that include a preferred embodiment. Unless otherwise indicated, all parts and percentages are by weight.

EXAMPLE 1

32 grams of sawdust (15.8% moisture content) and a maximum particle size of less than 1 cm is pre-treated by a soaking in 200 ml of 0.96% aqueous sulfuric acid. After 71 hours of soaking at a temperature of about 23° C., the mixture is neutralized by the addition of 2.6 g of $Ca(OH)_2$ (85%). The neutralized, wet mixture is placed in a 1-liter pressure reaction apparatus and 272 g of water and 11.1 g of $Ca(OH)_2$ (85%) are added.

The reaction apparatus is sealed, agitated and heated to initiate the reaction at a temperature above 150° C. A maximum temperature of 300°–310° C. is reached after three hours. The reaction apparatus is quickly cooled to room temperature and the gas phase is vented prior to opening the reaction vessel. The gas contains carbon monoxide and various flammable hydrocarbons.

The reaction product is removed from the reaction apparatus and filtered to remove $CaCO_3$ and other water insoluble materials. The filtrate or liquid phase is extracted with chloroform to remove organic by-products. The remaining aqueous layer is evaporated under reduced pressure to yield a brown solid. The major components of this impure solid are the calcium salts of acetic acid, lactic acid, and glycolic acid. The yield is about 40% based on the dry weight of the sawdust. The solid is useful as a de-icer when sprinkled on ice at minus 3° C. at a rate of 30 g/m².

EXAMPLES 2–13

Examples 2–13 generally follow the procedure of Example 1 and further illustrate the present invention. The process conditions and results are summarized in Tables I and II which follow:

TABLE I

| PROCESS CONDITIONS - Examples 2–13 | | |
| --- | --- | --- |
| Example No. | Raw Material and Amount | Conditions of Presoak | Treating Agent and Amount |
| 2 | Sawdust/32 g | 0.96% $H_2SO_4$ 71 hrs | dolomite/9.3 g |

TABLE I-continued
PROCESS CONDITIONS - Examples 2-13

| | | | |
|---|---|---|---|
| 3 | Sawdust/32 g | 0.96% H$_2$SO$_4$ 71 hrs | MgO/5.1 g |
| 4 | Sawdust/32 g | 0.96% H$_2$SO$_4$ 71 hrs | Ca(OH)$_2$/36.3 g |
| 5 | Sawdust/16.2 g | None | Ca(OH)$_2$/6.5 g |
| 6 | Newsprint/32 g | None | Ca(OH)$_2$/9.4 g |
| 7 | Weeds/32 g | None | Ca(OH)$_2$/9.4 g |
| 8 | Starch/8.1 g | None | Ca(OH)$_2$/6.5 g |
| 9 | Sawdust/32 g +500 psi N$_2$ | Acid | Ca(OH)$_2$/9.4 g |
| 10 | Sawdust/16 g | Acid | Ca(OH)$_2$/4.7 g |
| 11 | Sawdust/64 g | Acid | Ca(OH)$_2$/14.1 g |
| 12 | Sawdust/32 g | Acid | Ca(OH)$_2$/2.35 g |
| 13 | Sawdust/32 g | Acid | Ca(OH)$_2$/9.4 g |

| Example No. | Total Amount of Water ml | Maximum Reaction Temperature (°C.) | Maximum Pressure (psig) |
|---|---|---|---|
| 2 | 407 | 316 | 1720 |
| 3 | 275 | 335 | 2120 |
| 4 | 273 | 270 | 2700 |
| 5 | 136.5 | 260 | 850 |
| 6 | 273 | 336 | 2080 |
| 7 | 273 | 330 | 1950 |
| 8 | 136.5 | 230 | 600 |
| 9 | 273 | 296 | 2620 |
| 10 | 273 | 260 | 1300 |
| 11 | 273 | 297 | 1700 |
| 12 | 273 | 270 | 900 |
| 13 | 273 | 350 | 3100 |

| Example No. | Cooled By | Filtered | Solvent Extracted and Solvent |
|---|---|---|---|
| 2 | Quenched | Yes | No |
| 3 | Air Cooled | Yes | No |
| 4 | Quenched | Yes | Yes, Chloroform |
| 5 | Quenched | Yes | Yes, Chloroform |
| 6 | Air Cooled | Yes | No |
| 7 | Air Cooled | Yes | No |
| 8 | Quenched | Yes | No |
| 9 | Air Cooled | Yes | No |
| 10 | Air Cooled | Yes | No |
| 11 | Air Cooled | Yes | No |
| 12 | Quenched | Yes | No |
| 13 | Quenched | Yes | No |

TABLE II
PRODUCT DESCRIPTION - Examples 2-13

| Example No. | Liquid or Dried | De-Icer solids (Ca Salts) yield as percent of raw material |
|---|---|---|
| 2 | liquid | 12 |
| 3 | liquid | 14 |
| 4 | liquid | 32 |
| 5 | liquid | 23 |
| 6 | liquid | 27 |
| 7 | liquid | 27 |
| 8 | liquid | 21 |
| 9 | liquid | 31 |
| 10 | liquid | 26 |
| 11 | liquid | 45 |
| 12 | liquid | 17 |
| 13 | liquid | 13 |

| | De-Icer Solids Composition | | | |
|---|---|---|---|---|
| | As Calcium Salts, % | | | Combined Oxalate |
| Example No. | lactate | acetate | glycolate | and Formate |
| 2 | 16.4 | 57.2 | 26.4 | less than 20 ppm |
| 3 | 8.9 | 77.3 | 13.8 | less than 20 ppm |
| 4 | 10.4 | 78.9 | 10.7 | less than 20 ppm |
| 5 | 25.8 | 21.6 | 52.6 | less than 20 ppm |
| 6 | 48.6 | 41.8 | 9.6 | less than 20 ppm |
| 7 | 48.6 | 40.9 | 10.5 | less than 20 ppm |
| 8 | 56.7 | 19.1 | 24.2 | less than 20 ppm |
| 9 | 66.8 | 18.3 | 14.9 | less than 20 ppm |
| 10 | 69.4 | 26.7 | 3.9 | less than 20 ppm |
| 11 | 11.1 | 19.6 | 69.3 | less than 20 ppm |
| 12 | 40.0 | 39.7 | 20.3 | less than 20 ppm |
| 13 | 52.2 | 29.8 | 18.0 | less than 20 ppm |

We claim:

1. The method of de-icing which comprises contacting an iced surface with a de-icing chemical, said chemical consisting essentially of a mixture of alkaline earth metal salts of acetic acid, lactic acid, and glycolic acid with the mixture being substantially free of alkaline earth metal salts of oxalic acid or formic acid.

2. Methods of claim 1 in which the de-icing chemical is a particulate solid.

3. Methods of claim 1 in which the de-icing chemical is a liquid.

4. Methods of claim 3 in which the alkaline earth metal is calcium.

5. A mixture of chemicals useful as a de-icing chemical, said mixture consisting essentially of the alkaline earth metal salts of acetic acid, lactic acid, and glycolic acid with the mixture being substantially free of alkaline earth metal salts of oxalic acid or formic acid.

6. Mixtures of chemicals according to claim 5 in which the alkaline earth metal is calcium.

7. The process of producing a mixture of chemicals which is useful as a de-icer, said process comprising the following steps:
   (a) reacting a polysaccharide raw material with a treating agent selected from the group consisting of alkaline earth metal oxides and hydroxides; said reaction occuring under aqueous conditions and at superatmospheric pressure; thereby producing a crude reaction product;
   (b) separating and recovering from said reaction product a mixture of chemicals that contains alkaline earth metal salts of acetic acid, lactic acid, and glycolic acid; said mixture being substantially free of the alkaline earth metal salts of formic acid and oxalic acid.

8. The process of claim 7 in which the source of polysaccharide is a solid, cellulosic material.

9. The process of claim 7 in which the source of polysaccharide is wood particles.

10. The process of claim 7 in which the source of polysaccharide is waste paper.

11. The process of claim 9 in which the alkaline earth metal is calcium.

12. The process of claim 11 in which the alkaline earth metal is magnesium.

13. The process of claim 12 in which the reaction product is cooled from a reaction temperature to a temperature below 150° C. by releasing the pressure on the rection system to cause flash evaporation of volatile components of the reaction mixture.

14. The process of producing a mixture of chemicals which is useful as a de-icer, said process comprising the following steps:
   (a) pre-soaking a cellulosic raw material in water for at least four hours;
   (b) mixing the wet cellulosic material with a treating agent selected from the group consisting of alkaline earth metal oxides and hydroxides;
   (c) heating the wet mixture in a closed system to a reaction temperature;
   (d) reacting the wet mixture to form a reaction mixture;

(e) reducing the temperature of the reaction mixture;
(f) removing volatile by-products of the reaction from the reaction mixture;
(g) separating the reaction mixture into a liquid phase and a solid phase;
(h) recovering from the liquid phase a mixture of chemicals, said mixture being characterized by the presence of alkaline earth salts of acetic acid, lactic acid and glycolic acid and being further characterized by the substantial absence of the alkaline earth salts of oxalic acid and formic acid.

15. The process of claim 14 in which the source of cellulose is a solid, cellulosic waste product.

16. The process of claim 14 in which the source of cellulose is wood particles.

17. The process of claim 14 in which the source of cellulose is waste paper.

18. The process of claim 16 in which the alkaline earth metal is calcium.

19. The process of claim 18 in which the amount of water present is sufficient to provide a solids content of 5 to 50 weight percent.

20. The process of claim 19 in which the reaction product is cooled from a reaction temperature above 150° C. to a temperature below 150° C. by releasing the pressure on the reaction system to cause flash evaporation of volatile components of the reaction mixture.

21. Product produced by the process of claim 7.
22. Product produced by the process of claim 8.
23. Product produced by the process of claim 9.
24. Product produced by the process of claim 10.
25. Product produced by the process of claim 11.
26. Product produced by the process of claim 12.
27. Product produced by the process of claim 13.
28. Product produced by the process of claim 14.
29. Product produced by the process of claim 15.
30. Product produced by the process of claim 16.
31. Product produced by the process of claim 17.
32. Product produced by the process of claim 18.
33. Product produced by the process of claim 19.
34. Product produced by the process of claim 20.
35. The method of de-icing which comprises contacting an iced surface with product of claim 21.
36. The method of de-icing which comprises contacting an iced surface with product of claim 22.
37. The method of de-icing which comprises contacting an iced surface with product of claim 23.
38. The method of de-icing which comprises contacting an iced surface with product of claim 24.
39. The method of de-icing which comprises contacting an iced surface with product of claim 25.
40. The method of de-icing which comprises contacting an iced surface with product of claim 26.
41. The method of de-icing which comprises contacting an iced surface with product of claim 27.
42. The method of de-icing which comprises contacting an iced surface with product of claim 28.
43. The method of de-icing which comprises contacting an iced surface with product of claim 29.
44. The method of de-icing which comprises contacting an iced surface with product of claim 30.
45. The method of de-icing which comprises contacting an iced surface with product of claim 31.
46. The method of de-icing which comprises contacting an iced surface with product of claim 32.
47. The method of de-icing which comprises contacting an iced surface with product of claim 33.
48. The method of de-icing which comprises contacting an iced surface with product of claim 34.

* * * * *